United States Patent
Hill et al.

(10) Patent No.: US 8,573,898 B2
(45) Date of Patent: Nov. 5, 2013

(54) FORM MILLING CUTTER FOR THE MACHINING OF TITANIUM ALLOYS ETC

(75) Inventors: Christopher Peter Ralph Hill, Wotton-under-Edge (GB); Mark Kirby, Sheffield (GB)

(73) Assignee: Rolls-Royce PLC, London (GB)

( * ) Notice: Subject to any disclaimer, the term of this patent is extended or adjusted under 35 U.S.C. 154(b) by 68 days.

(21) Appl. No.: 13/496,209

(22) PCT Filed: Sep. 21, 2010

(86) PCT No.: PCT/GB2010/001773
§ 371 (c)(1), (2), (4) Date: Mar. 15, 2012

(87) PCT Pub. No.: WO2011/036439
PCT Pub. Date: Mar. 31, 2011

(65) Prior Publication Data
US 2012/0170985 A1    Jul. 5, 2012

(30) Foreign Application Priority Data
Sep. 22, 2009 (GB) .................................. 0916561.4

(51) Int. Cl.
*B23C 5/12* (2006.01)
*B23C 3/34* (2006.01)

(52) U.S. Cl.
USPC .................... 407/56; 407/57; 407/60; 407/53

(58) Field of Classification Search
USPC ............... 407/53, 56, 57, 60, 61, 62
See application file for complete search history.

(56) References Cited

U.S. PATENT DOCUMENTS

| 2,923,053 | A | * | 2/1960 | Babbitt | 407/53 |
| 3,139,001 | A | * | 6/1964 | Arno Geyer et al. | 76/107.1 |
| 3,610,075 | A | * | 10/1971 | Fabish | 76/108.6 |
| 3,624,718 | A | * | 11/1971 | Ribich | 76/101.1 |
| 5,868,606 | A |  | 2/1999 | Martin |  |
| 6,164,877 | A |  | 12/2000 | Kamata et al. |  |
| 2009/0324347 | A1 | * | 12/2009 | Kirby et al. | 407/53 |

FOREIGN PATENT DOCUMENTS

| GB | 1297453 A | 11/1972 |
| WO | 2008090301 A1 | 7/2008 |
| WO | 2009070424 A1 | 6/2009 |

* cited by examiner

*Primary Examiner* — Will Fridie, Jr.
(74) *Attorney, Agent, or Firm* — King & Schickli, PLLC

(57) ABSTRACT

A method of manufacturing a multi-tooth fir-tree or bulbous form milling cutter, by the grinding of a blank with a grinding wheel, wherein, a flat clearance angle $\Theta$ of between 0° and 20° is generated on each tooth (13) by the path (14) of the grinding wheel (10), with each tooth (13) having a width (X) from tip to point of maximum clearance (see FIG. 5), calculated as follows: —X={[(R tan $\Theta$)cos $\Theta$] cos $\Theta$}±0.25% (being calculation (A)) where R=radius of cutter, and where $\Theta$=clearance angle measured from a tangent to the tooth tip, and furthermore, wherein, each tooth (13) has a variable depth (Y) around the cutter, calculated as follows: —Y={[$\pi$D]/[180/$\Theta$]}0.5±0.2. (being calculation (B)) where D=maximum diameter of the form at any given point along the form. The invention also includes fir tree and bulbous milling cutters produced by the above defined method.

7 Claims, 11 Drawing Sheets

SHOWING THE EFFECT OF THE FORM ON THE CLEARANCE ANGLE AT THE BOTTOM OF THE FORM. TAPERING THE TOOTH WIDTH MAINTAINS MAXIMUM CLEARANCE THROUGH THE FORM

Where  $X = \{[(R \tan \theta) \cos \theta] \cos \theta \} \pm 0.25\%$

SECTION THROUGH THE END OF THE FORM MILLING CUTTER

SHOWING THE EFFECT OF THE FORM ON THE CLEARANCE ANGLE AT THE BOTTOM OF THE FORM. TAPERING THE TOOTH WIDTH MAINTAINS MAXIMUM CLEARANCE THROUGH THE FORM

FIG. 10
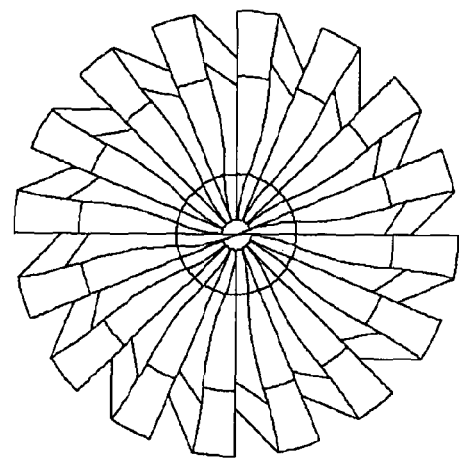
↓ A
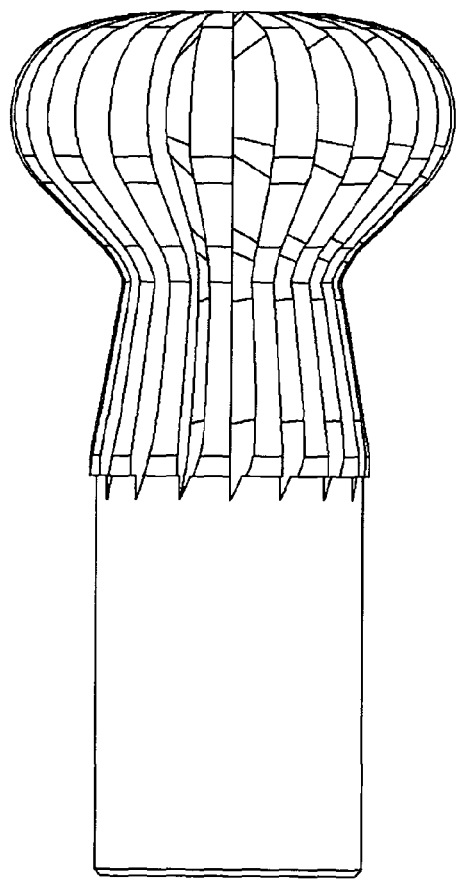
FIG. 9

FORM MILLING CUTTER FOR THE MACHINING OF TITANIUM ALLOYS ETC

This application is the national stage of PCT/GB2010/001773, filed Sep. 21, 2010, which claims priority from British Patent Application Serial Number 0916561.4, filed Sep. 22, 2009.

FIELD OF THE INVENTION

This invention relates to a method of manufacturing a fir-tree, or bulbous root form milling cutter for the machining of curved profiles, such as roots, in difficult materials such as titanium alloys, nimonic alloys, etc, as are frequently employed in turbofans for use in power generation or aero engines, and to form milling cutters manufactured by this method.

BACKGROUND OF THE INVENTION

Complex, small, fir tree or bulbous root form geometry milling cutters are difficult to make, having a relatively small number of cutting edges—typically 3 to 5 cutting edges—and hence have correspondingly restricted cutting rates. A recent development of Applicants, is a milling cutter described in WO 2008/090301, but whilst providing substantial advantages in the cutting sphere for which it was designed, is impossible to make in complex profiles containing a mixture of concave and convex shapes on the periphery.

The result is that, in order to machine roots of desired profile for turbofan components, extensive broaching operations from roughing to finishing are unavoidable, involving all manufacturers, worldwide, in a substantial broaching machine investment programme, with capital costs typically £2-3 million per machine, resulting in substantial installation costs, maintenance costs, floor area requirements, machining time, and hence significant manufacturing costs.

Although it is self-evident that the rate of metal removal of course increases with the number of teeth of a rotary cutter, and a broaching tool has numerous cutting teeth for both roughing and finishing operations in a single tool, the performance of form milling cutters is, as indicated above, constrained by the number of teeth that can be manufactured within a given tool diameter.

Whilst the range of cutters of WO 2008/090301 starts to address this issue on parallel or ball nosed tools, the production of a range of form milling cutters of both dovetail and bulbous forms, with a substantially increased number of teeth/flutes has been impossible to date. This has resulted in current industry use, worldwide, of form milling cutters incorporating between 4 and 6 teeth of a given tool diameter of 25 mm as exemplified in FIGS. 1A to 1C in fir-tree form and in FIGS. 2A and 2B in bulbous form, with the current constraints limiting the number of teeth that can be produced in existing form milling cutters.

Because, in prior art proposals, clearance on each tooth is generated by the arc of the grinding wheel, the diameter of the grinding wheel is the limiting factor during manufacture of form milling cutters, which diameter defines the number of teeth that can be produced. This is due to the current manufacturing process, where, as the tool is rotated to produce the necessary clearance, the grinding wheel fouls the following tooth and thus damages the form. Reducing the diameter of the wheel therefore allows for more teeth to be produced, but is impractical beyond a certain diameter of grinding wheel. Therefore, restriction of the number of teeth in the cutter normally is unavoidable.

In US 2008/020600 (SASU) is described a ball nose cutter, of relatively simple geometry for the machining of integrally bladed rotors, rather than being a form milling cutter with which the invention is concerned, and is a cutter that scans across a shape and is tapered for ready re-grinding.

In WO 2009/070424 (TDY Industries) is described a landless i.e. sharp toothed, burr rather than a form milling cutter with which the invention is concerned, and produced by the method of U.S. Pat. No. 5,868,606 (Martin), the latter describing a ball end cutter, with grinding by a wheel having an axis of rotation different to the cutter axis of rotation.

In U.S. Pat. No. 6,164,877 (Kamata) is described a fir-tree, formed milling cutter with but three cutting edges, supporting the comments above on the inability of any manufacturer to produce more than 3, 4 or at most 6 cutting edges on a fir-tree etc root form milling cutter, such that all turbofan manufacturers have been obliged to include a broaching step.

OBJECT OF THE INVENTION

A basic object of the invention is the provision of a method of manufacturing a fir-tree or bulbous root form milling cutter capable of replacing the current broaching process, and to form milling cutters manufactured by this process.

SUMMARY OF THE INVENTION

According to a first aspect of the invention, there is provided a method of manufacturing a multi-tooth fir-tree or bulbous form milling cutter, by the grinding of a blank with a grinding wheel, wherein, (i) a flat clearance angle $\Theta$ of between 0° and 20° is generated on each tooth, by the path of the grinding wheel, with each tooth having a width (X) from tip to point of maximum clearance (see FIG. 5), calculated as follows: —

$$X = \{[(R \tan \Theta)\cos \Theta] \cos \Theta\} \pm 0.25\% \quad \text{(being calculation (A))}$$

where R=radius of cutter, and
where $\Theta$=clearance angle measured from a tangent to the tooth tip,
and furthermore, wherein
(ii) each tooth has a variable depth (Y) around the cutter (see FIG. 7), calculated as follows: —

$$Y = \{[\pi D]/[180/\Theta]\} 0.5 \pm 0.2. \quad \text{(being calculation (B))}$$

where D=maximum diameter of the form at any given point along the form.

SUMMARY OF A SECOND ASPECT OF THE INVENTION

According to a second aspect of the invention, there is provided a fir-tree or a bulbous form milling cutter produced by the method of the first aspect.

ADVANTAGES OF THE INVENTION

From the enhanced geometry resulting from moving from the prior art technique of generating clearance by the arc of the grinding wheel, and generating a flat clearance angle (by the path of the grinding wheel), with adherence to features (i) to (ii) above, is derived an ability to produce a form milling cutter with a substantially enhanced tooth and flute density compared with prior art proposals, probably of the order of 2 and 10 times more teeth, the invention being based upon the concept that to increase the number of teeth for a given diameter it is essential to control the shape, form and dimensions of each tooth to ensure that clearance is achieved. These requirements are further complicated when applying to to form cutters, as clearance is required to be created at the top of the form as well as at the smallest diameter of the form, as indicated in FIG. 5.

Whilst FIG. 5 shows a parallel tooth form of tooth width 'X' from the top to the bottom of the flute creating a strong landwidth, this on certain types of form would create a situation at the bottom of the form where the tooth width 'X' goes beyond the point of maximum clearance. In this situation it is necessary for 'X' to become variable, creating a tapered 'X' controlling point of maximum clearance to the full depth of form, as indicated in FIG. 6.

In order to control the tooth width 'X' it is imperative for the path of the flute to follow the profile of the form. This enables the width of 'X' to be controlled parallel within given parameters and not compromise clearance angles, especially on deep forms, as indicated in FIG. 7.

The clearance angle will follow the plane of a straight line by generating through a grinding process. By producing with a flat clearance the position of the following tooth can be clearly defined. The lower the clearance the greater number of teeth can be produced. However, due to some of the deep forms required, a constant clearance angle of up to 20 degrees may be required. Current production techniques would produce the tools shown in FIGS. 3 and 4 with the associated constraints discussed above. Producing the clearance angle along a flat plane in accordance with the invention allows any diameter of grinding wheel to be used and not be constrained—as with current techniques.

The combination of defined flute form, optimum tooth form, contoured flute form, and flat clearance angle outlined above, results in the capability to produce novel, unique form cutters with a substantial increase in the numbers of teeth for a given size/diameter of form milling cutter. These enhancements in flute density and hence tooth density could be in the order of between 2 and 10 times more than current industry solutions. This represents a step change that potentially revolutionises the production of male and female root forms, used within power generation and aeroengine industries, offering the possibility of total elimination of broaching in the production of turbofans.

PREFERRED OR OPTIONAL FEATURES

The angle $\Theta$ is 12°, or thereabouts.
The angle $\Theta$ is 6-12°.
The grinding wheel is a form grinding wheel.
The grinding wheel is an angled grinding wheel to contour grind the form.
The form milling cutter is produced in high speed steel.
The form milling cutter is produced in carbide.

BRIEF DESCRIPTION OF THE DRAWINGS

FIGS. 8 to 11 are, respectively, a perspective view, a side elevation, and an end elevation on arrow A, and an end elevation on arrow B of an example of a bulbous milling cutter manufactured in accordance with the method of the invention, having 16 teeth/flutes compared with <6 teeth/flutes of prior art proposals.

DETAILED DESCRIPTION OF THE DRAWINGS

Figure 1A:
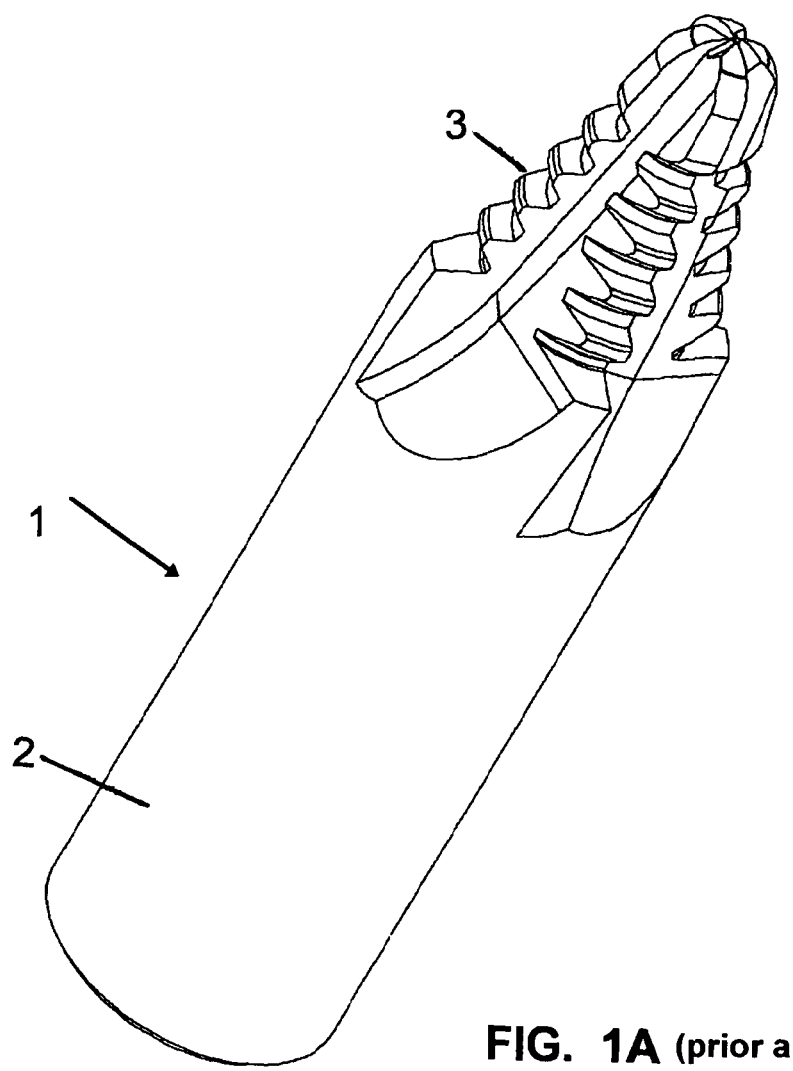
FIGS. 1A, 1B and 1C are, respectively, a perspective view, a side elevation, and an end elevation of a fir-tree milling cutter produced by prior art techniques.
Figure 1C:
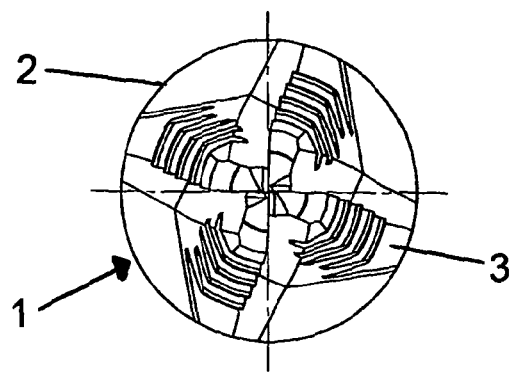
Figure 1B:
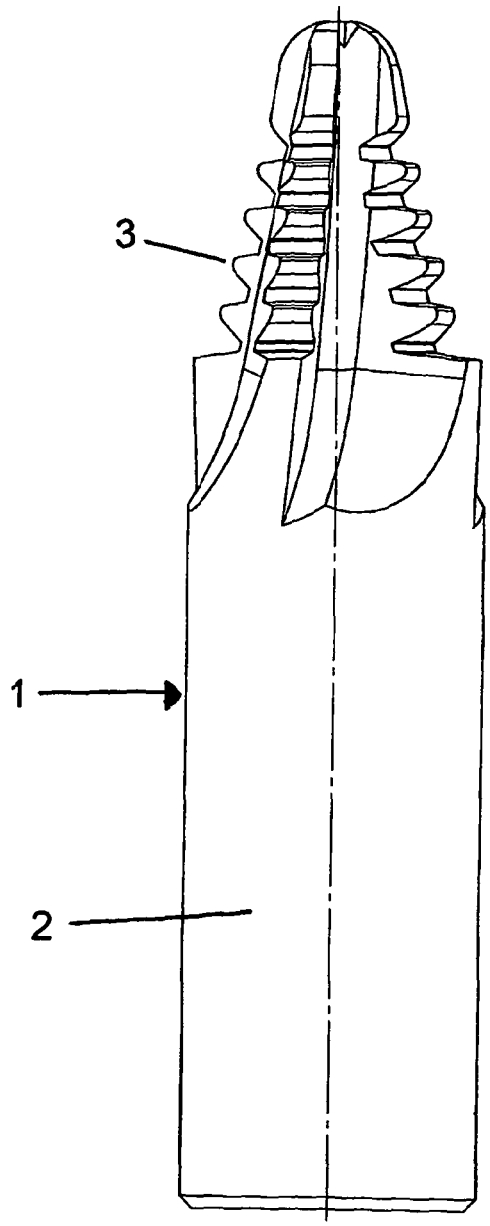

In FIGS. 1A and 1B is shown a fir-tree type form milling cutter 1 having a shank 2 adapted to be clamped in an arbor or chuck of a machine tool, and cutter teeth 3 etc produced by conventional form grinding, resulting usually, in 4-6 sets of teeth.

Figure 2B:
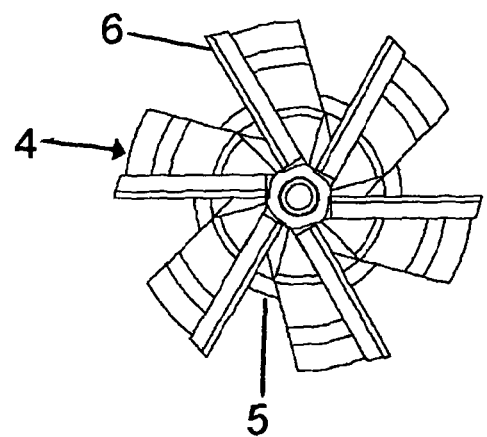
FIGS. 2A and 2B correspond to FIGS. 1A and 1B, but show a bulbous milling cutter produced by prior art techniques.
Figure 2A:
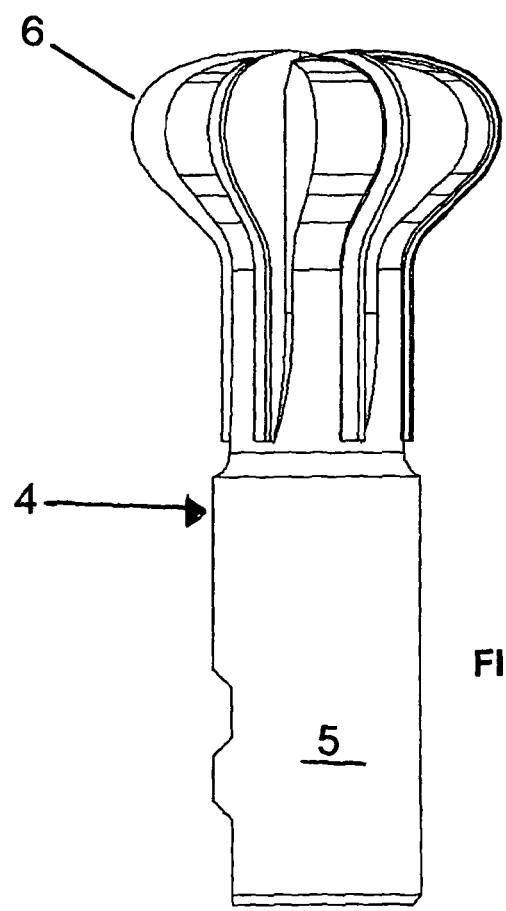

In FIGS. 2A and 2B is shown a bulbous type form milling cutter 4 having a shank 5 adapted to be clamped in an arbor or chuck of a machine tool, with cutter teeth 6 etc again produced by conventional grinding techniques, again resulting in some 4-6 teeth.

Figure 3:
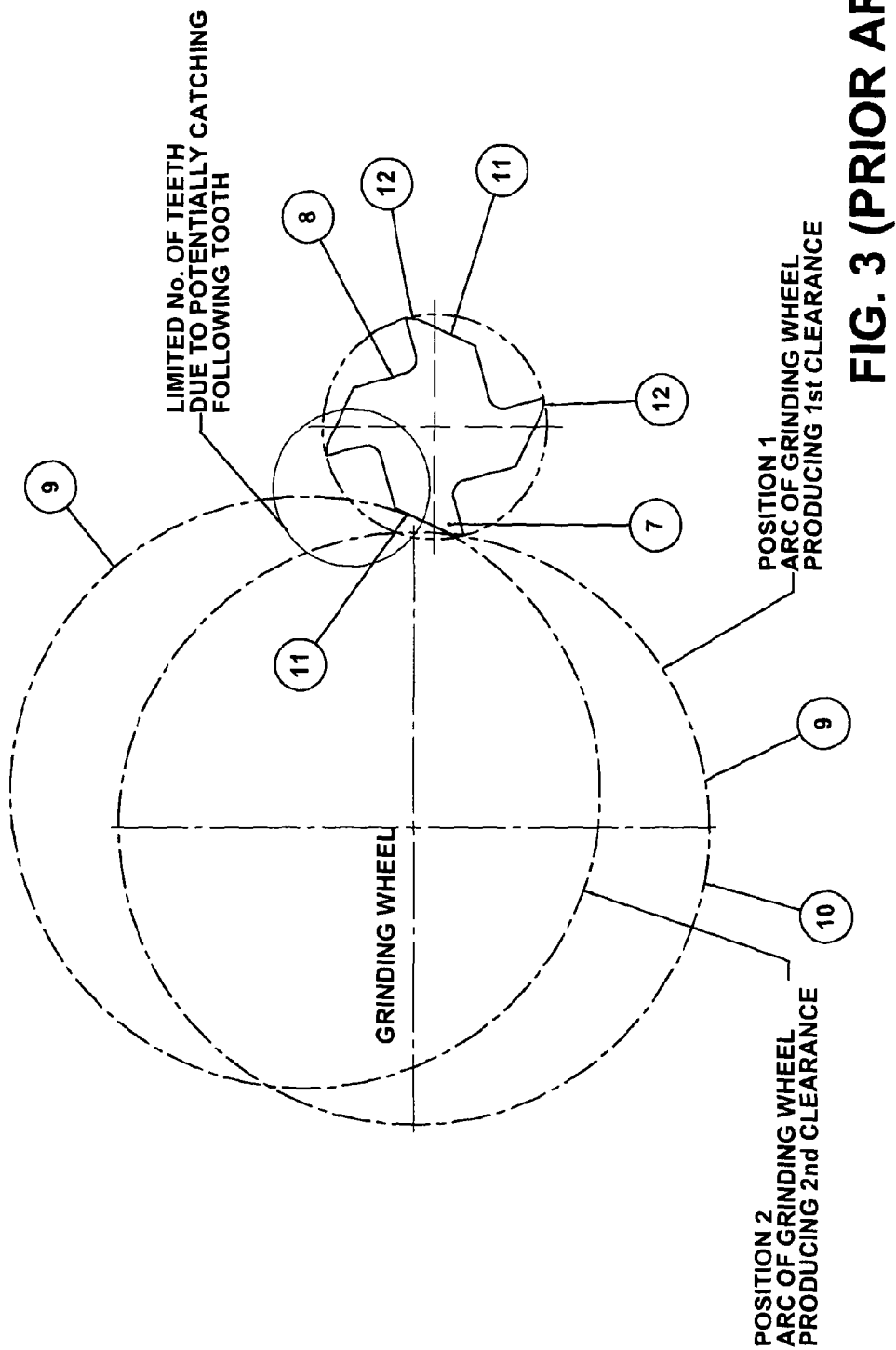
FIGS. 3 and 4 are end views on a milling cutter showing diagrammatically how the number of teeth on a milling cutter is restricted by the grinding wheel during grinding by prior art techniques.
Figure 4:
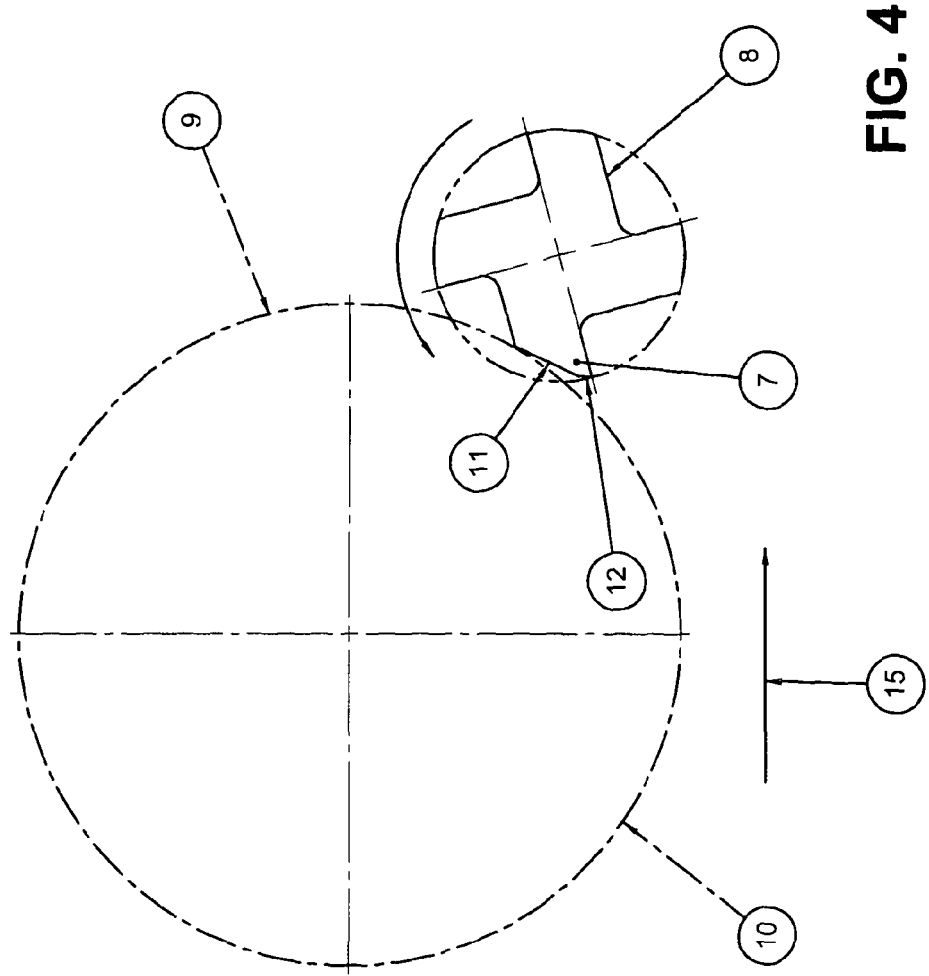

In FIGS. 3 and 4 is illustrated how the number of teeth 7 on a cutter 8 in the course of manufacture are restricted by the need to avoid periphery 9 of grinding wheel 10 fouling the next succeeding tooth during grinding of a second clearance 11 on a preceding tooth following the grinding of a first clearance 12, with the problem being acute at the trailing end of the second clearance 11, with grinding wheel infeed along path 15 thereby using the arcuate periphery of the grinding wheel 10 to generate the clearance.

Figure 5:
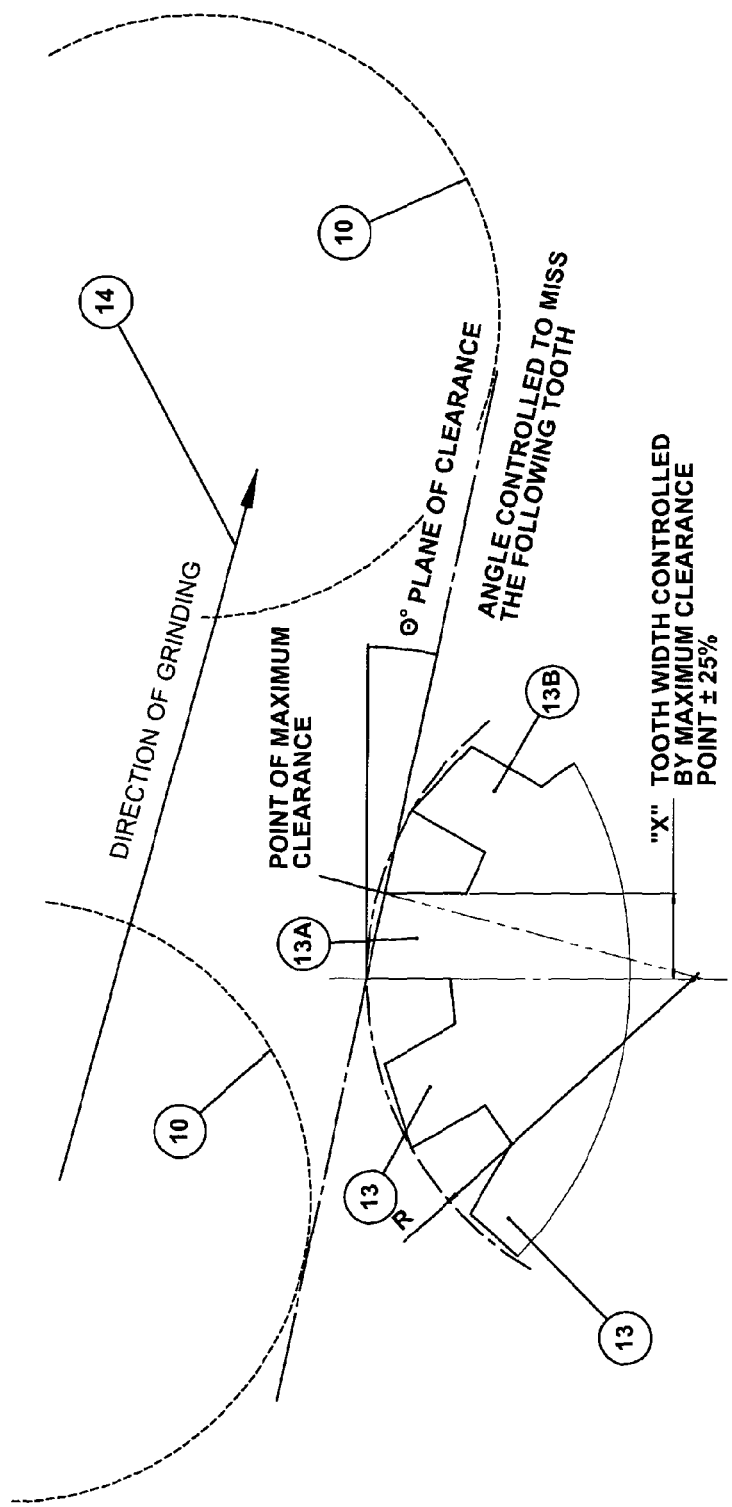
FIG. 5 is a section through an end of a form milling cutter showing diagrammatically how the flute form is ground in accordance with the invention.
Figure 6:
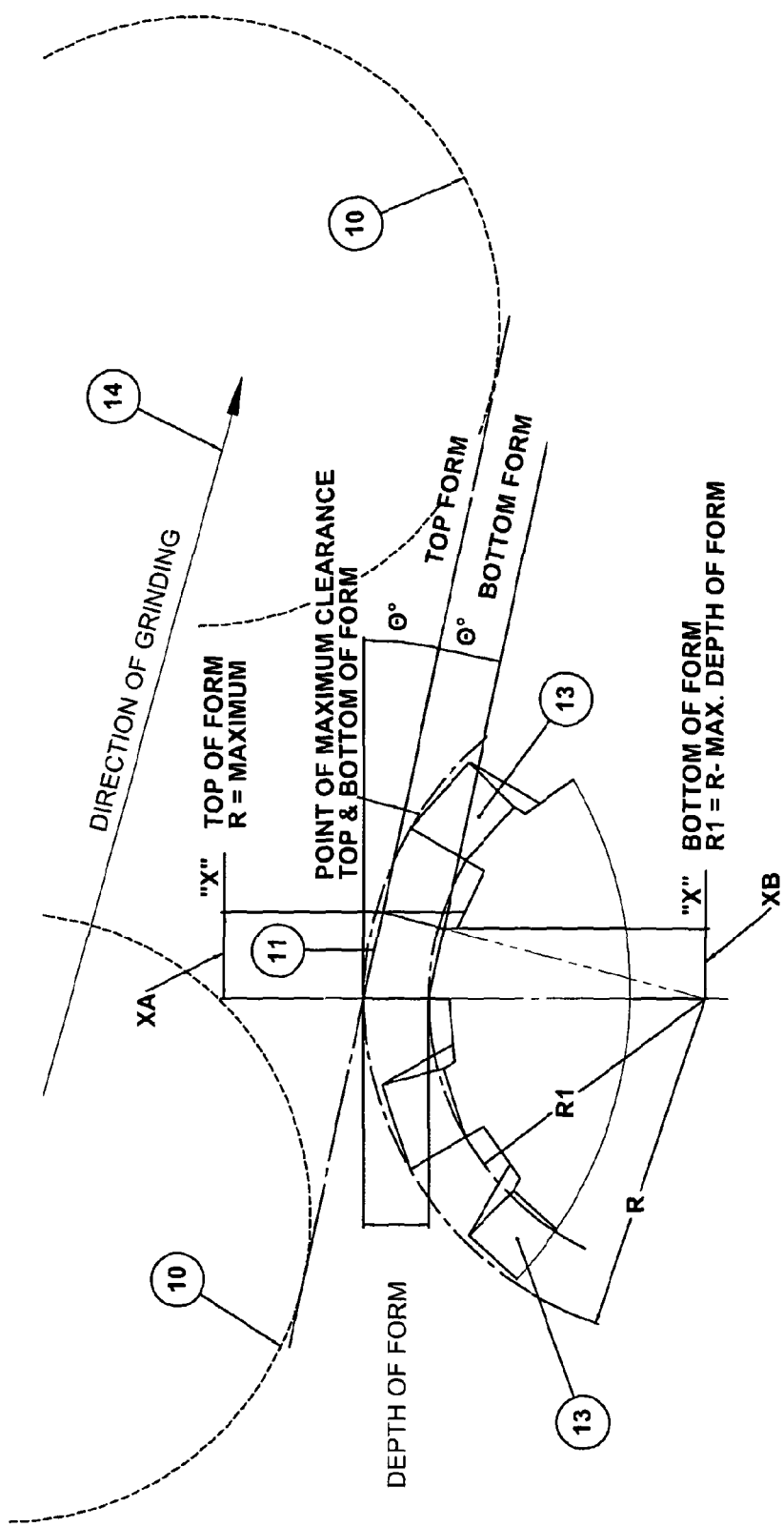
FIG. 6 shows diagrammatically how the tooth form is ground in accordance with the invention.
Figure 7:
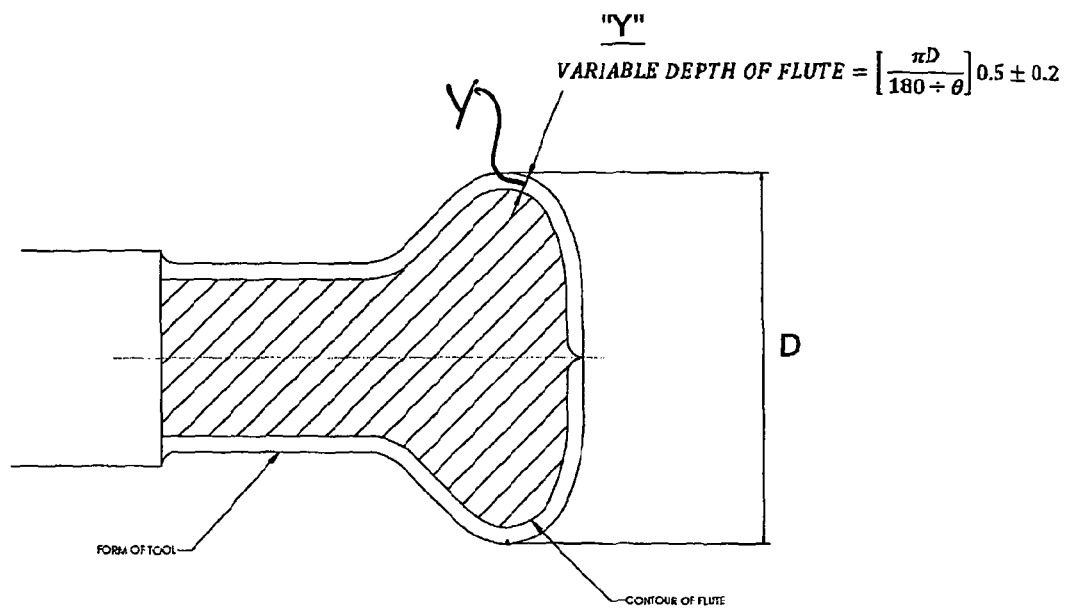
FIG. 7 corresponds to FIG. 6 but shows diagrammatically how the flute form is to contoured in accordance with the invention.
Figure 8:
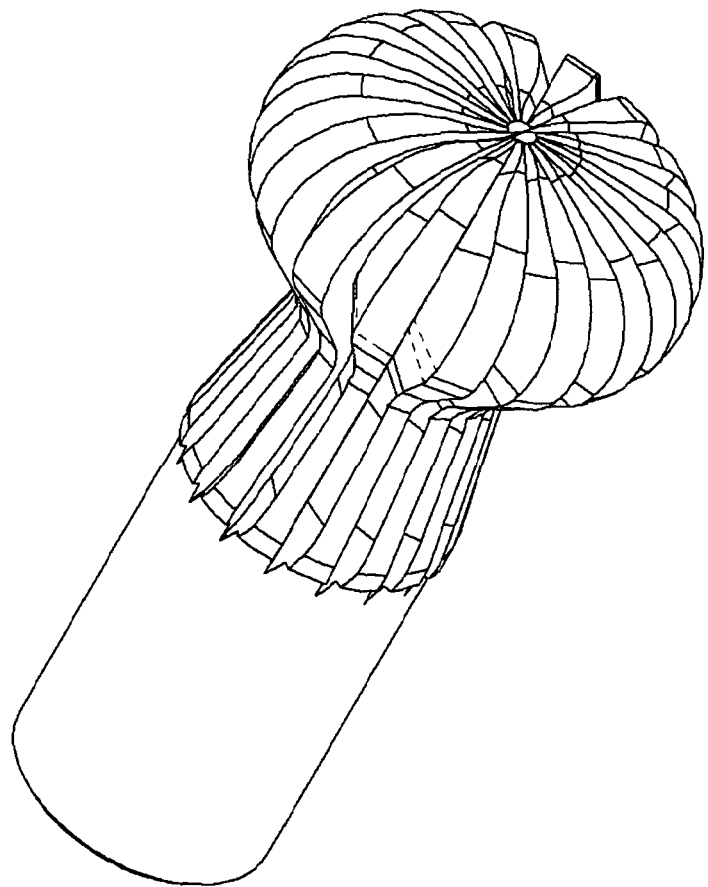
Figure 11:
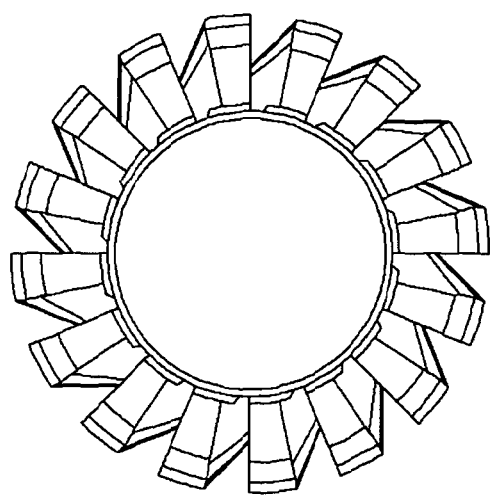

FIGS. 5 and 6 illustrate how, in accordance with the invention, a considerably increased number of teeth 13 can be ground into a form milling cutter of a given diameter or radius R by movement of the grinding wheel 10 along linear path 14 to generate the necessary clearance, by which technique it is possible to ensure that, particularly at the trailing end of a second clearance on tooth 13A, the periphery of the grinding wheel 10 does not contact the leading edge of the next tooth 13B. FIG. 5 indicates a parallel tooth cutter, and FIG. 6 a tapering tooth width cutter from XA to XB, both produced by restricting the width X of each tooth in accordance with calculation (A), and giving each tooth a variable depth in accordance with calculation (B).

The result is that, following the method of the invention, it is possible to produce a cutter with a considerably increased number of teeth, FIGS. 8 to 11 illustrating a bulbous form milling cutter with 16 teeth compared with only the 4-6 teeth that prior art grinding techniques have been able to produce for a given tool diameter.

Clearly, the multiple increase in teeth results in faster machining and a considerable reduction in production costs, such that the benefits of fewer machine tools and reduced floor area can be realized for a given machining programme.

The invention claimed is:

1. A method of manufacturing a multi-tooth fir-tree, or bulbous form milling cutter, by the grinding of a blank with a grinding wheel, wherein,
    (i) a flat clearance angle $\Theta$ of between 0° and 20° is generated on each tooth, by the path of the grinding wheel, with each tooth having a width (X) from tip to point of maximum clearance, calculated as follows: —

$$X = \{[(R \tan \Theta) \cos \Theta] \cos \Theta\} \pm 0.25\%$$

where R=radius of cutter, and where Θ=clearance angle measured from a tangent to the tooth tip, and furthermore, wherein (ii) each tooth has a variable depth (Y) around the cutter, calculated as follows:

$$Y=\{[\pi D]/[180/\Theta]\}0.5\pm0.2,$$

where D=maximum diameter of the form at any given point along the form.

2. A method as claimed in claim 1, wherein Θ is about 12°.

3. A method as claimed in claim 1, wherein Θ is 6-12°.

4. A method as claimed in claim 1, wherein the grinding wheel is a form grinding wheel.

5. A method as claimed in claim 1, wherein the grinding wheel is an angled wheel to contour grind the form.

6. A multi-tooth fir-tree or bulbous form milling cutter produced by the method defined in claim 1 in high speed steel.

7. A multi-tooth fir-tree or a bulbous form milling cutter produced by the method defined in claim 1 in carbide.

\* \* \* \* \*